United States Patent [19]

Keedy et al.

[11] Patent Number: 5,725,292
[45] Date of Patent: Mar. 10, 1998

[54] SCRAPING APPARATUS FOR A TRACK IDLER

[75] Inventors: Dave E. Keedy, Pekin; Jerry D. Fidler, Mossville; Daniel L. Mikrut, Peoria; Jon S. Burdick, N. Pekin, all of Ill.

[73] Assignee: Caterpillar Inc., Peoria, Ill.

[21] Appl. No.: 670,382

[22] Filed: Jun. 25, 1996

[51] Int. Cl.$^6$ .................................................. B62D 55/088
[52] U.S. Cl. .................................... 305/110; 305/107
[58] Field of Search ............................ 305/100, 107, 305/109, 110 (U.S. only), 12; 172/112, 610; 404/129; 280/855, 856

[56] References Cited

U.S. PATENT DOCUMENTS

| | | | |
|---|---|---|---|
| 1,084,187 | 1/1914 | Wiberg. | |
| 1,932,054 | 10/1933 | Von Brethorst | 280/158 |
| 2,077,919 | 4/1937 | Engstrom | 280/158 |
| 2,108,291 | 2/1938 | McNally | 280/158 |
| 2,146,882 | 2/1939 | Baker et al. | 305/8 |
| 2,157,253 | 5/1939 | Yetter | 280/158 |
| 2,504,128 | 4/1950 | Jacobson et al. | 244/100 |
| 2,531,111 | 11/1950 | Daniels | 305/10 |
| 2,560,307 | 7/1951 | Slemmons | 305/8 |
| 2,937,883 | 5/1960 | Alcoriza | 280/158 |
| 3,082,044 | 3/1963 | Klemm et al. | 305/12 |
| 3,861,762 | 1/1975 | Freedy et al. | 305/12 |
| 4,265,494 | 5/1981 | Matsubara et al. | 305/12 |
| 4,531,787 | 7/1985 | Hart et al. | 305/12 |
| 5,226,703 | 7/1993 | Norman | 305/12 |

FOREIGN PATENT DOCUMENTS

| | | | |
|---|---|---|---|
| 626208 | 5/1927 | United Kingdom | 305/12 |
| 662701 | 12/1951 | United Kingdom. | |
| 8301234 | 4/1983 | WIPO | 305/12 |

*Primary Examiner*—Russell D. Stormer
*Attorney, Agent, or Firm*—William C. Perry

[57] ABSTRACT

In the operation of a track chain assembly a high degree of wear is normally experienced due to the environment in which a track-type machine must operate. This wear is typically accelerated by foreign matter that is carried by an idler member of the track chain assembly and is permitted to remain on its contact surfaces as they engage the other track chain components. The present invention provides a scraper assembly that defines a plurality of scraping portions that continuously engage the contact surfaces of idler to remove foreign material therefrom before the contact surfaces engage other track chain components.

18 Claims, 6 Drawing Sheets

Fig_3_

Fig_4_

Fig_5_

Fig_6_

SCRAPING APPARATUS FOR A TRACK IDLER

TECHNICAL FIELD

This invention relates to a scraping apparatus for a track assembly and more particularly to a scraping assembly that will remove foreign matter from the idler member of a track assembly.

BACKGROUND ART

It is very common for construction machinery to be operated in very hostile environments, especially those propelled by the use of track assemblies. In most instances the machinery, such as a track-type tractor for instance, will be operated over all types of soil in a variety of conditions that includes mud, dust and sand. The track assemblies by the nature of their design are subjected to a high degree of wear. This wear is greatly accelerated when operated in certain types of soils such as sand, tar sand or other well known abrasive materials.

During the operation of a track-type machine, the track links and shoes pick up material as they contact the ground and carry it upward, over the lower run of the track assembly as the track chain rotates. When in the elevated position, the debris becomes loosened from the upper track components and drops down on the lower run of the track. When this occurs, the debris often falls on the contact surfaces, or wear surfaces, of the various track chain components. When this material is gritty or naturally abrasive, the wear, due to the constant contact between these surfaces, is greatly accelerated. The wear surfaces of particular concern include the wear rails of the track links and the tread portions of the track rollers and track idlers.

Because of this long standing problem several attempts have been made to provide various scraper and/or guard assemblies to prevent the build up of material on the track chain components or to deflect the debris away from critical areas. While some of these designs have been known to operate with some success, the overall mass of the guarding components is often excessive, adding to the weight and cost of the machine. The same can be said with some scraper designs which, in many cases, are relatively intricate. In some instances, the designs incorporate a detailed profile that matches that of one or more track chain components and functions to remove material from the various components as they rotate during the operation of the machine. These types of designs are often subject to severe wear also. Not only does the intricacy of these designs add significantly to the cost of their manufacture, it also adds to the cost of replacement parts.

The present invention is directed to overcoming one or more of the problems set forth above.

DISCLOSURE OF THE INVENTION

In one aspect of the present invention a scraping apparatus is provided for a track assembly. The scraping apparatus includes a frame and an idler that is rotatably mounted to the frame. The idler defines an upraised center portion and a pair of contact surfaces that are positioned on opposite sides of the center portion. The idler is positioned on the frame in a manner wherein the contact surfaces are positioned for engagement with the track assembly. A scraper assembly is provided that has a first end portion that defines a plurality of scraping surfaces and a second end portion that is mounted to the frame. The scraping apparatus is mounted to the frame in a manner wherein each of the scraping surfaces is positioned for alignment and continuous engagement with a respective one of the center portion and contact surfaces defined by the idler.

With a scraping apparatus as set forth above, it can be seen that a scraping assembly is provided to continuously engage the outer surfaces of the idler of a track assembly. In doing so, debris that is carried by the idler will be removed through contact with the scraping assembly as the idler rotates. This effectively prevents the debris from remaining on the contact surfaces of the idler during their engagement with the track assembly thereby avoid unnecessary and accelerated wearing of the track chain components.

BEST MODE FOR CARRYING OUT THE INVENTION

Figure 1:
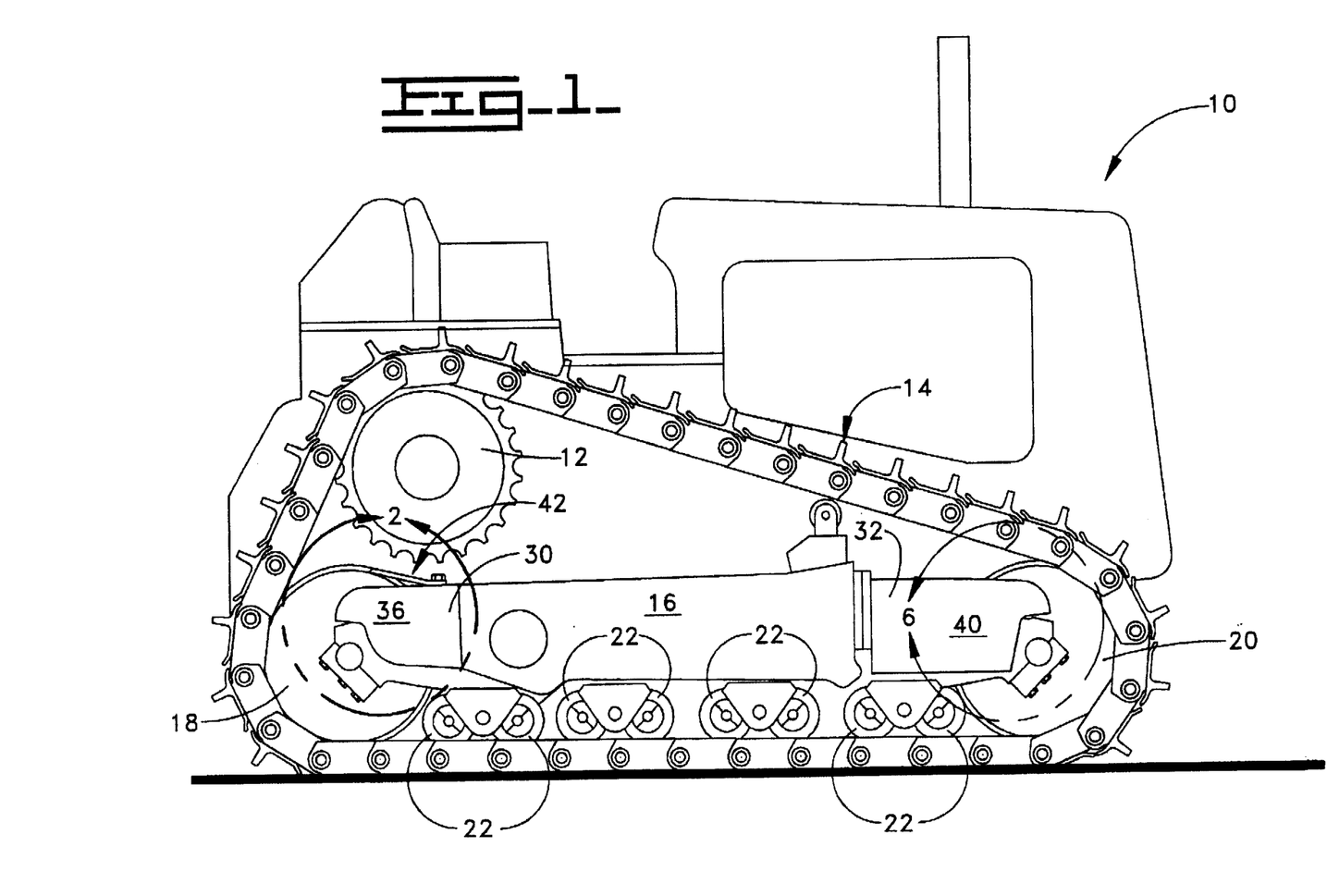
FIG. 1 is a diagrammatic side view of a track-type machine that embodies the principles of the present invention.

Referring now to the drawings, in particular to FIG. 1, it can be seen that a construction machine 10 is shown. The illustrated machine is a track-type tractor that provides power from a conventional drive train (not shown) to drive a sprocket 12. The sprocket in turn, is engaged with a track chain assembly 14 of conventional construction to provide motive traction between the ground and the machine to propel the machine over the terrain. The track chain assembly 14 is supported by a track roller frame 16 that mounts a first idler 18 on the rear portion of the track roller frame and a second idler 20 on the front portion of the track roller frame. A plurality of track rollers 22 are positioned between the idlers 18 and 20. The track chain assembly 14 is entrained about and supported by the sprocket 12, the first and second idlers 18 and 20 and track rollers 22. When rotated by the sprocket, the track chain assembly rotates about these components in rolling contact therewith, when the machine is moved in either direction.

The idlers 18 and 20 each define an upraised center portion 24 and a pair of contact surfaces 26 and 28 that are positioned on opposite sides of the center portion 24. The center portion is positioned centrally with respect to the track chain assembly to serve as a guide member while the contact surfaces engage portions of the spaced track links (not shown) defined by the track assembly. Each idler 18 and 20 is mounted at opposite end portions 30 and 32 of the track roller frame 16. Each end portion of the track roller frame is bifurcated to define a pair of spaced apart arms. The first idler 18 is positioned between arms 34 and 36 defined by the first end portion 30 of the track roller frame while idler 20 is positioned between arms 38 and 40 defined by the second end portion 32 of the track roller frame. Both idlers are rotatably mounted about an axis that is transversely positioned with respect to the respective pairs of bifurcated arms.

Figure 2:
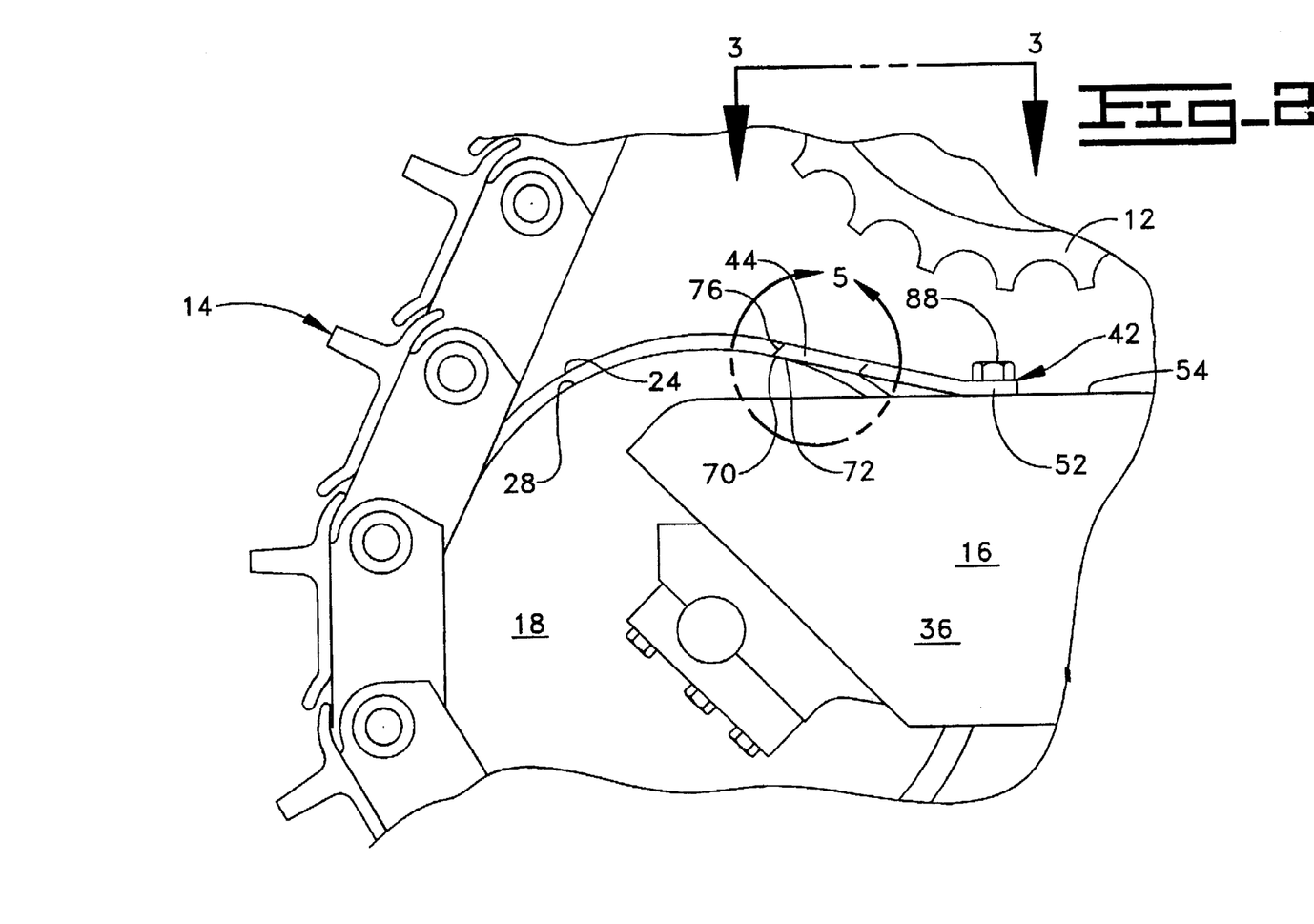
FIG. 2 is an enlarged view of the portion of the track roller frame encompassed within the area indicated by the numeral 2 in FIG. 1.
Figure 3:
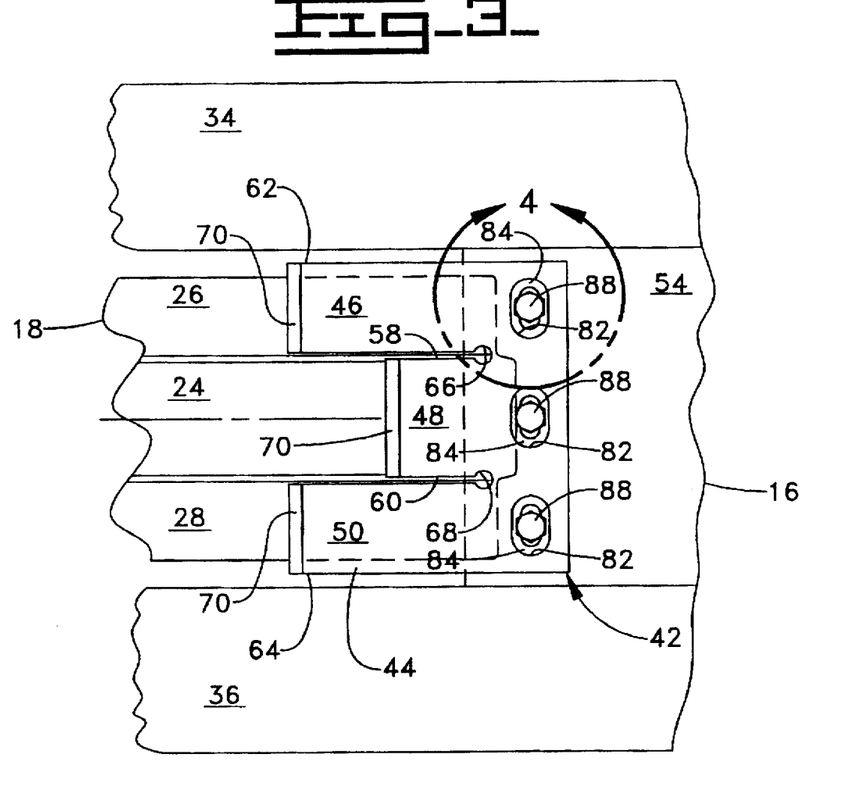
FIG. 3 is a diagrammatic top view of the track roller frame taken along lines 3—3 of FIG. 2.

Referring to FIGS. 2 and 3, a scraper assembly 42 is shown in operative engagement with the first idler 18. In the preferred embodiment, the scraper assembly 42 includes an elastomeric scraper pad 43. The scraper pad 43 has a first end portion 44 that defines a plurality of scraping portions 46, 48 and 50 and a second end portion 52 that is mounted to an upper surface 54 of the track roller frame 16. A pair of slots 58 and 60 are defined in the scraper pad 43 that are spaced inwardly from the opposing sides 62 and 64 of the pad as well as from one another. Being so positioned, the scraper pad is divided into the first, second and third scraping portions 46, 48 and 50 respectively. As can best be seen in FIG. 4, each of the slots terminates at a bore, 66 and 68, respectively that extends through the scraper pad. Each bore is located between the first and second end portions, 44 and 52 respectively, a distance from the first end portion that is approximately one third to three quarters of the entire length of the scraper pad, or a distance that is sufficient to allow each of the scraping portions to move relatively independently from one another. Since the slots terminate at a bore, tearing of the scraper pad is inhibited by relative movement of the scraping portions. The scraper pad 43 is mounted in registry with the first idler 18 so that the first and third scraping portions 46 and 50, are aligned with and in continuous engagement with the contact surfaces 26 and 28 respectively. Likewise, the second scraping portion 48 is aligned with and in continuous contact with the upraised center portion 24 of the first idler 18.

Figure 5:
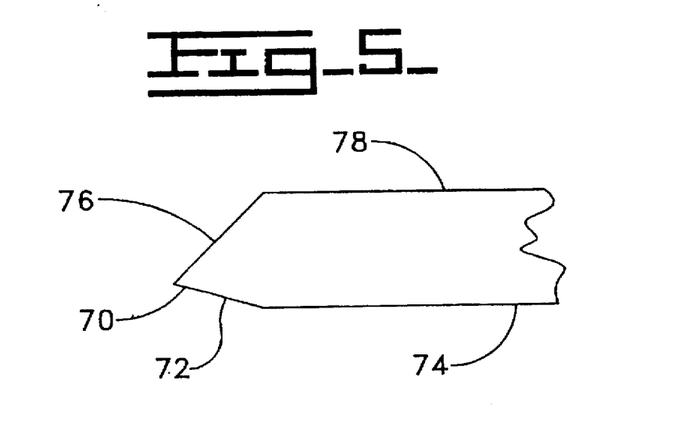
FIG. 5 is an enlarged portion of the scraping assembly encompassed in the area indicated by the numeral 5 as shown in FIG. 2.

Each of the scraping portions 46, 48 and 50 is substantially planar in configuration and defines a scraping surface 70 on the distal end thereof which is best shown in FIG. 5. The scraping surfaces are identical, therefore it is to be understood that the reference numerals set forth hereinafter will apply to all three scraping portions. Turning now to FIG. 5, it can be seen that each scraping portion is defined by a pair of angled surfaces that intersect one another. A first angled surface 72 extends forwardly and upwardly from a lower surface 74 of the scraper pad 43. The first angle may fall within a range of 0 to 20 degrees but has an optimum angle of approximately 15 degrees. The first angled surface 72 is positioned to contact the idler substantially along the entire extent of its length. A second angled surface 76 extends forwardly and downwardly from an upper surface 78 of the scraper pad 43 and intersects with the first angled surface to form a point. This angle may fall within a range of 0 to 90 degrees but has an optimum angle of approximately 45 degrees.

Figure 4:
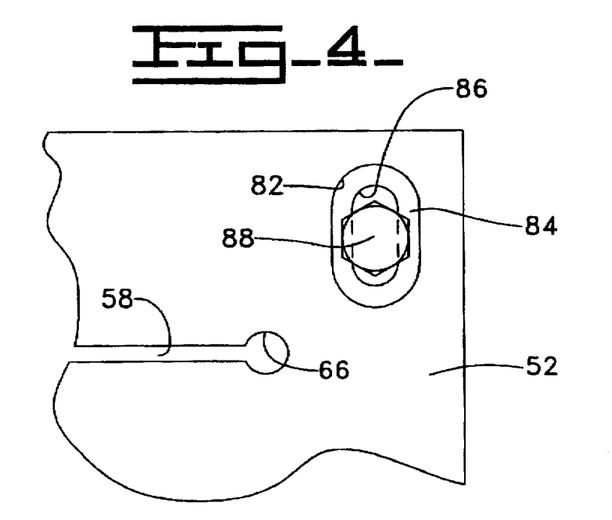
FIG. 4 is an enlarged view of the portion of FIG. 3 that is encompassed within the area indicated by the numeral 4.

As previously set forth, the second end portion 52 of the scraper assembly 42, which in the preferred embodiment includes the scraper pad 43 is mounted to the upper surface 54 of the track roller frame 16. As is best shown in FIG. r, the second end portion of the scraper pad defines a plurality of elongated bores 82 that are spaced laterally from one another. Each bore receives an insert 84 that is made of metal or hard plastic. Each insert defines an generally oblong slot 86 that is of sufficient size to receive the shank of a fastening member such as a bolt 88. Each bolt may be threadably received in an appropriate mounting bore 89 that is formed in the upper surface 54 of the track roller frame 16. Each slot is larger than the shank of the bolt to allow adjustment of the scraper pad with respect to the idler and the track roller frame. In addition to the adjustment capabilities, the inserts, being of harder material that the elastomeric pads, do not compress under the force of the fasteners and thereby aid in the securing of the scraper pad to the track roller frame.

Figure 6:
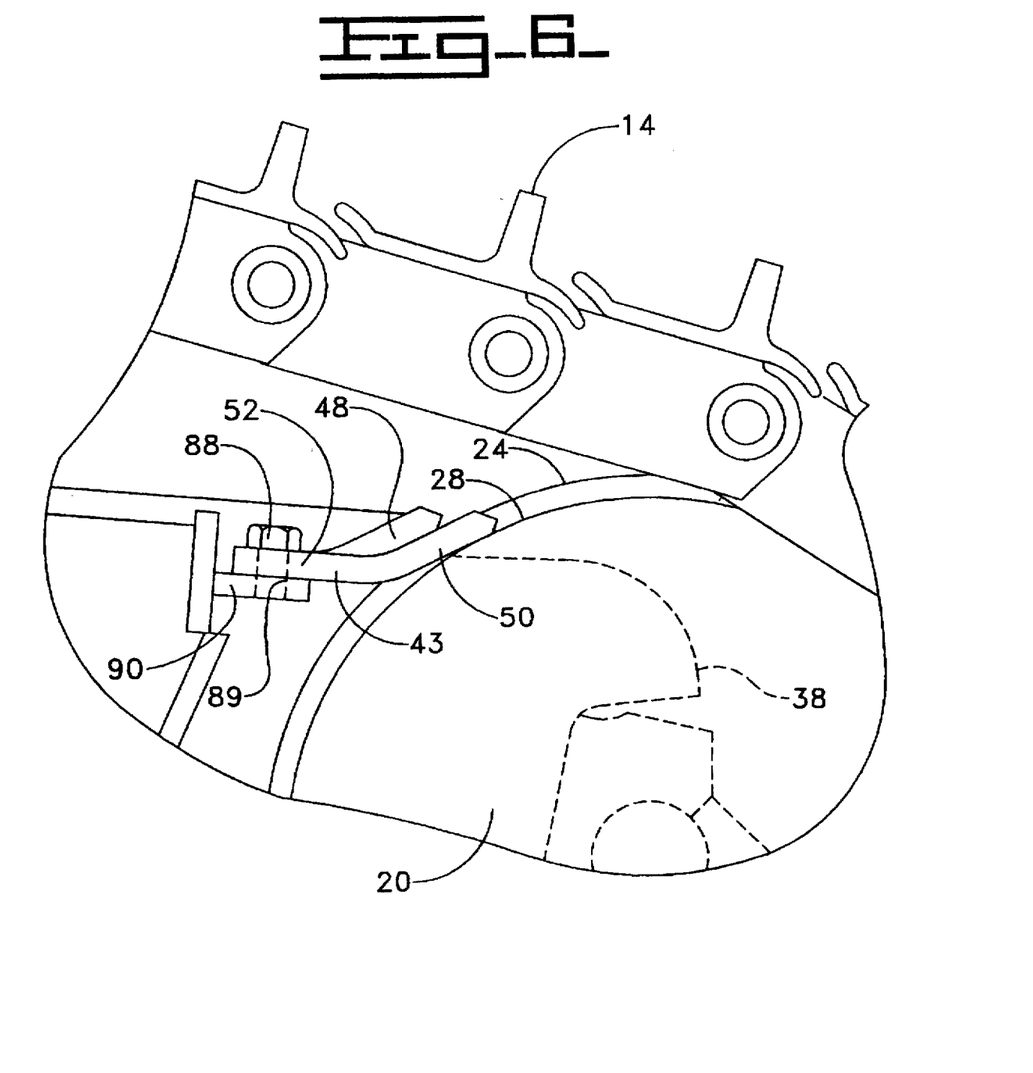
FIG. 6 is an enlarged, partially sectioned view of the portion of the track roller frame encompassed within the area indicated by numeral 6 in FIG. 1 and discloses an alternate embodiment of the present invention.

Turning now to FIG. 6, an alternate embodiment of a scraper assembly 42 is shown in association with the second, or front idler 20. In this embodiment, the scraper assembly includes a scraper pad that is identical to the scraper pad that has been previously set forth and is identified by the same reference numeral 43. In this embodiment however, the second end portion 52 is mounted to flange member 90 that is defined by the track roller frame 16 at a position that is spaced beneath the upper surface 54 thereof. Being so positioned, the elevation of the scraper assembly 42 my be lowered with respect to that shown in conjunction with the first idler 18. This is necessary since there is less room available between the track chain assembly 14 and the upper surface 54 at the forward end 32 of the track roller frame.

Figure 7:
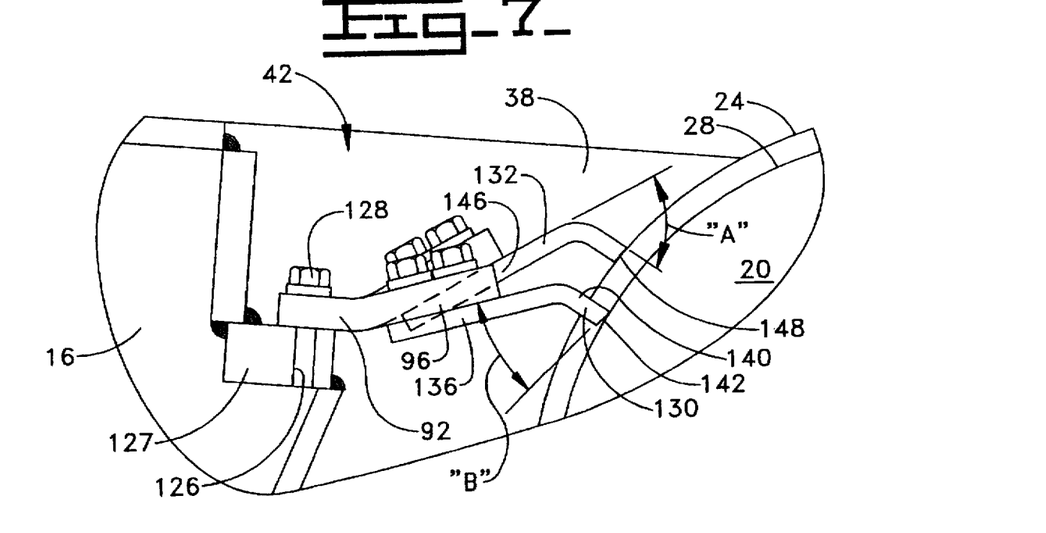
FIG. 7 is a diagrammatic side view similar to that of FIG. 6 disclosing yet another embodiment of the present invention.
Figure 8:
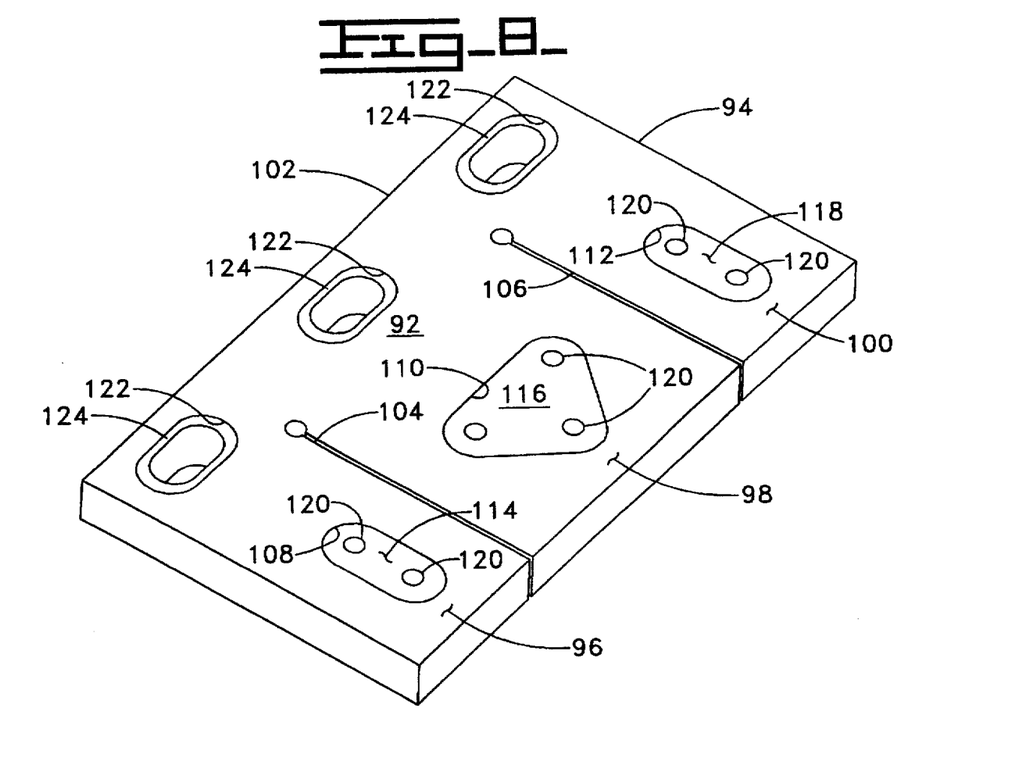
FIG. 8 is a diagrammatic perspective view of the mounting pad of the embodiment of the scraper apparatus disclosed in FIG. 7.
Figure 9:
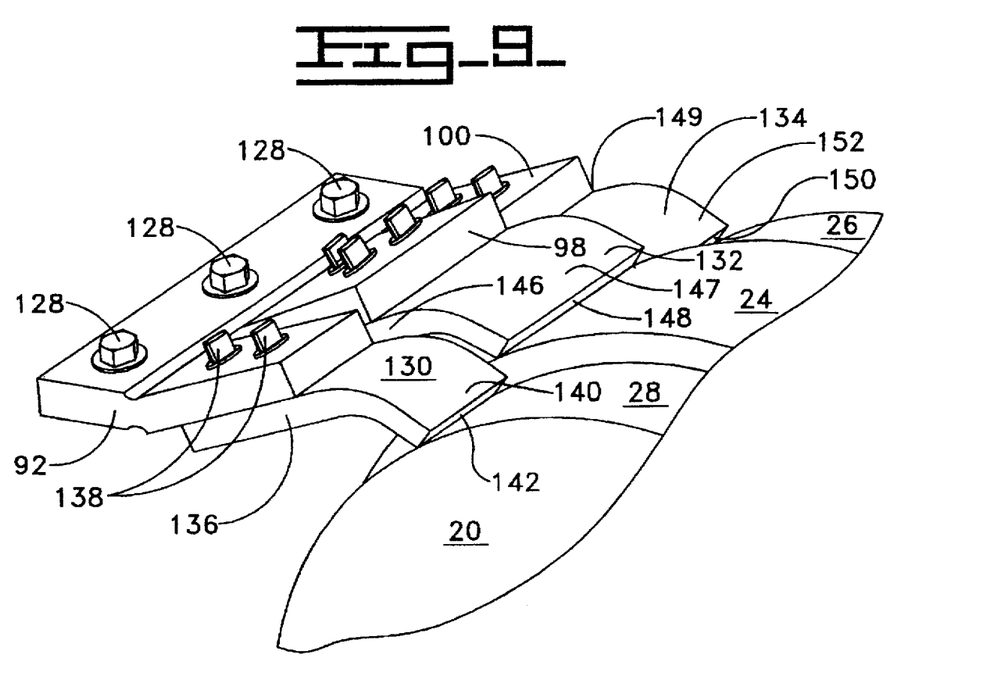
FIG. 9 is a diagrammatic perspective view of the embodiment of the scraper apparatus disclosed in FIG. 6 with the frame members being removed to more clearly illustrate the invention.

Turning now to FIGS. 7–9, yet another embodiment of the present invention is disclosed. In this embodiment, the scraper assembly 42 includes an elastomeric mounting pad 92. The mounting pad 92, which is more clearly shown in FIG. 8, defines a first end portion 94 that is divided into three separate mounting portions 96, 98 and 100. A second end portion 102 is mounted to the track roller frame 16 in a manner to be described in greater detail hereinafter. The first end portion 94 of the mounting pad defines a pair of slots 104 and 106. Slots 104 and 106 are essentially identical to slots 58 and 60 described in conjunction with the scraper pad 56 shown in the preferred embodiment (FIGS. 1–5) and function in substantially the same way. Slots 104 and 106 are spaced from the sides of the mounting pad and each other in a manner to divide the first end portion 94 into the three mounting portions, a first mounting portion 96, a second, centrally disposed mounting portion 98 and a third mounting portion 100. The slots allow the three mounting portions to move substantially independently of one another. Each mounting portion defines an opening 108, 110 and 112 in each of the respective mounting portions 96, 98 and 100 respectively. Each opening receives a non-elastomeric insert 114, 116 and 118 respectively, that is secured to the elastomeric mounting pad by bonding or other suitable manner. Each insert further defines a plurality of mounting bores 120. The second end portion 102 of the mounting pad 92 also defines a plurality of openings 122 that receive non-elastomeric inserts 124. Inserts 124 are essentially identical in shape and function to the inserts 84 that were previously described in conjunction with the elastomeric scraper pad 56 and serve as an adjustable mounting for the mounting pad 92 to the frame 16. The inserts 124 are alignable with a plurality of mounting bores 126 that are defined in a flange 127 of frame 16 and receive a plurality of mounting bolts 128 or other suitable fasteners, to adjustably secure the mounting pad to the frame.

A plurality of non-elastomeric scraping members 130, 132 and 134 are secured to the mounting pad 92 and extend forwardly therefrom to contact the idler, which in the illustrated embodiment is the second idler 20. The first scraping member 130 is formed of a metal plate and has a first, substantially planar end portion 136 that is secured to the first mounting portion 96. The first end portion 136 defines a plurality of mounting bores (not shown) that align with the bores 120 defined by the insert 114 positioned in the first mounting portion 96. The aligned bores receive a suitable fastening members such as a bolts 138 to secure the two members together. A second end portion 140 defines a downwardly curved portion that extends from the first portion 136 at an angle "A" that ranges between 40 and 50 degrees but has an optimum angle of approximately 45 degrees with respect to the planar first portion 136. The second end portion 140 also defines an engagement surface 142 that is positioned for continuous contact with the contact surface 28 of idler 20. The engagement surface 142 is oriented at a second angle "B" with respect to the first end portion 136. The second angle ranges between 20 and 30 degrees with an optimum angle of approximately 25 degrees.

The second scraping member 132 is mounted to the second mounting portion 98 in a manner substantially the same as that described with respect to the first scraping member 130. In the illustrated embodiment the insert 116 is shown to be triangularly shaped. The insert functions to receive a plurality of fasteners to secure a first end portion 146 of the second scraping member to the second mounting portion 98. Since the second scraping member is somewhat larger than the first and third scraping members the insert 144 is somewhat enlarged to provide greater retention capabilities. It is to be understood that an insert of a different shape and size may also be utilized in its place. With the exception of the slight size differential, the second scraping member is substantially the same in configuration as the first scraping member. The second scraping member defines a second end portion 147 that has an engagement surface 148 formed thereon that is configured like that of engagement surface 142 and is adapted for engagement with the upraised center portion 24 of the idler 20 (FIG. 9) in a manner identical to that of the first scraping member 130.

The third scraping member 134 is substantially identical to the first scraping member 130. The third scraping member has a first end portion 149 that is secured to the third mounting portion 100 in the same manner as scraper members 130 and 132. Likewise, the third scraping member 134 defines an engagement surface 150 (FIG. 9) on a second end portion 152 thereof that is positioned for engagement with the contact surface 26 of the idler 20.

In the embodiment disclosed in FIGS. 7-9, the mounting flange 127 is positioned even lower with respect to the track roller frame than the previously described embodiments to accommodate the extra length added by the scraping members 130, 132 and 134. Also, the engagement surfaces are angled such that the majority of the surface is engaged with the idler to continually remove foreign matter as the idler rotates with respect to the scraping members.

Industrial Applicability

In the operation of a track assembly, the track chain assembly 14 is rotated around the track roller frame 16 under the drive provided by the sprocket 12. As it rotates, the track roller frame is engaged by the front and rear idlers, 20 and 18 respectively, as well as the track rollers 22 positioned therebetween. The engagement between the idlers and the track chain occurs primarily along the contact surfaces 26 and 28 defined by the idlers.

As the track chain assembly 14 rotates, the components in the track chain assembly above the idler tend to shed foreign matter on the contact surfaces 26 and 28 of the idler as well as the upraised center portion 24 that is positioned therebetween. This may happen when the idler is rotated in either direction. As the idler rotates, the scraping portions 46, 48 and 50 of the preferred embodiment bear against the surfaces of the idler and remove the foreign matter. Removal of the foreign material occurs before those areas of the idler engage the track chain assembly. This is especially critical in the area of engagement between the contact surfaces 26 and 28 and the track chain where the wear is the most severe. With the removal of this material, the acceleration of wear that would normally occur between these surfaces is greatly reduced in most instances and substantially eliminated in others.

The scraper pad 43 is constructed of any one of many readily available compositions of high quality, natural rubber that is cutting chip and abrasion resistant between the temperatures of -55 to +80 degrees C. and having a durometer reading of 68±3 durometer A. This material, when used in the subject application, is extremely wear resistant.

The scraping members 130, 132 and 134 of the alternate embodiment are also positioned for continuous contact with the idler to remove foreign material in a similar manner. This contact is established and maintained by the bias provided by the elastomeric properties of the mounting pad 92. The mounting pad is comprised of the same natural rubber compound described above. Being so constructed, the mounting pad is durable enough to withstand the elements of the environment in which a track assembly will operate while effectively maintaining the angled face 142, 148 and 150 of each of the engagement surfaces 28, 24 and 26 respectively, of the idler. Since the scraper members are composed of metal or other non-elastomeric material, some wear is to be expected since there will be metal to metal contact between the scraper assembly and the idler. To accommodate this wear, each of the engagement surfaces is provided with an angle, indicated by "B", that will permit the wear to occur in a manner wherein the engagement surfaces will maintain their contact with the idler as it rotates with respect to the scraper assembly. In doing so, the scraper members 130, 132 and 134 are substantially self adjusting.

While the subject invention has been disclosed and described in conjunction with a track-type tractor having an elevated sprocket and a front and rear idler, it is to be understood that the same construction may be used on other track-type machines having a single idler.

With a scraper assembly 42 as described above, it can be seen that foreign material is continuously being removed from an area of the track chain assembly 14 that is subjected to a high degree of wear. Since the foreign material is removed from these areas before the idler contacts the track chain assembly, the acceleration of wear normally experienced, is substantially reduced. In doing so, the life of the many components of the track chain assembly is greatly increased. With the increased life of the track chain components, the machine is capable of increased service while the expense of maintaining and replacing track chain components is significantly reduced.

Other aspects, objects and advantages of the this invention can be obtained from a study of the drawings, the disclosure and the appended claims.

We claim:

1. A scraping apparatus for a track assembly, comprising:
   a frame;
   an idler having an upraised center portion and a pair of contact surfaces positioned on opposite sides of the center portion, said idler being rotatably mountable to the frame in a manner wherein said contact surfaces are positioned for engagement with the track assembly;

a scraper assembly defining an elastomeric scraping pad having a first end portion that defines a first scraping portion that is adapted for continuous contact with one of the contact surfaces of the idler, a second scraping portion adapted for continuous contact with the upraised center portion, a third scraping portion adapted for contact with the other of the contact surfaces and a second portion that is mounted to the frame; and a first slot positioned between the first and second scraping portions and a second slot positioned between the second and third scraping portions, said slots extending inwardly from the first end portion of the elastomeric scraping pad a preselected distance to permit the individual scraping portions to move relative to one another.

2. The scraping apparatus as set forth in claim 1 wherein the frame is a track roller frame having a bifurcated end portion that defines a pair of spaced apart arms.

3. The scraping apparatus as set forth in claim 2 wherein the idler is rotatably mounted between the spaced apart arms defined by the track roller frame.

4. The scraping apparatus as set forth in claim 1 wherein each of the first and second slots terminates at a bore that extends through the elastomeric scraping pad.

5. The scraping apparatus as set forth in claim 1 wherein the preselected distance that each of the first and second slots extends from the first end portions falls within a range of approximately one third to three fourths of an overall length of the elastomeric scraper pad.

6. The scraping apparatus as set forth in claim 1 wherein the elastomeric scraper pad is mounted to an upper surface of the frame.

7. The scraping apparatus as set forth in claim 6 wherein the second scraping portion has a length that is shorter than that of the first and third scraping portions by a preselected distance so that all the scraping portions will be positioned at substantially the same elevation with respect to the upper surface of the frame.

8. The scraping apparatus as set forth in claim 6 wherein the frame defines a mounting flange that is positioned in registry with the idler and extends substantially parallel to the axis of rotation of the idler, said mounting flange being spaced elevationally beneath the upper surface of the frame.

9. The scraping apparatus as set forth in claim 1 wherein the second end portion of the elastomeric scraping pad defines a plurality of non-elastomeric inserts having at least one mounting bore defined therein, said mounting bores defined by the inserts being alignable with a plurality of mounting bores defined by the frame, said aligned bores being adapted for receiving a fastener member to secure the second end portion of the elastomeric scraper pad to the frame.

10. The scraping apparatus as set forth in claim 1 wherein each of the scraping portions defined by the elastomeric scraping pad are substantially planar in configuration and having an angled end face defined by a first, idler engagement surface that is angled within a range of approximately 0 to 20 degrees with respect to the elastomeric scraping pad.

11. The scraping apparatus as set forth in claim 10 wherein each of the scraping portions defined by the elastomeric scraping pad includes a second angled surface that intersects with the first angled surface, said second angled surface is angled within a range of approximately 0 degrees to 90 degrees with respect to the elastomeric scraping pad.

12. The scraping apparatus as set forth in claim 1 wherein the scraper assembly further includes:

an elastomeric mounting pad having a first end portion that defines first, second and third mounting portions and a second end portion mounted to the frame;

a first, non-elastomeric scraping member having a first end portion mounted to the first mounting portion of the mounting pad and a second end portion adapted for continuous engagement with one of the contact surfaces defined by the idler;

a second, non-elastomeric scraping member having a first end portion mounted to the second mounting portion of the mounting pad and a second end portion adapted for continuous engagement with the upraised center portion of the idler;

a third, non-elastomeric scraping member having a first end portion mounted to the third mounting portion of the mounting pad and a second end portion adapted for continuous engagement with the other of the contact surfaces defined by the idler.

13. The scraping apparatus as set forth in claim 12 wherein a mounting insert is positioned within each of the mounting portions defined by the first end portion of the mounting pad to engage the respective first end portions of each non-elastomeric scraping member to provide a means for attachment between the respective non-elastomeric scraping members and the mounting pad.

14. The scraping apparatus as set forth in claim 13 wherein each mounting insert defines a plurality of mounting bores extending therethrough, said mounting bores being alignable with a plurality of mounting bores defined in the respective non-elastomeric scraping members, said aligned bores being adaptable to receive a fastening member therewithin to secure the respective non-elastomeric scraping members to the mounting pad.

15. The scraping apparatus as set forth in claim 14 wherein each of the mounting inserts are comprised of a metallic material.

16. The scraping apparatus as set forth in claim 12 wherein the first end portion of the respective non-elastomeric scraping members is generally planar and the second end portion is positioned at a first, downwardly directed angle with respect thereto.

17. The scraping apparatus as set forth in claim 16 wherein the second end portion of the respective non-elastomeric scraping members further defines an engagement surface that is positioned at a second angle with respect to the first end portion of the non-elastomeric scraping members.

18. The scraping apparatus as set forth in claim 17 wherein the first angle falls within a range of approximately 40 to 50 degrees and the second angle falls within a range of approximately 20 to 30 degrees.

\* \* \* \* \*